US008626076B2

(12) United States Patent
Tomita

(10) Patent No.: US 8,626,076 B2
(45) Date of Patent: Jan. 7, 2014

(54) TRANSMITTING CONTENT CORRESPONDING TO A TIME OF DISABLED COMMUNICATIONS

(75) Inventor: Hisashi Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 12/849,170

(22) Filed: Aug. 3, 2010

(65) Prior Publication Data
US 2011/0039523 A1 Feb. 17, 2011

(30) Foreign Application Priority Data

Aug. 11, 2009 (JP) ................................. 2009-186790

(51) Int. Cl.
*H04B 17/00* (2006.01)
(52) U.S. Cl.
USPC .......... 455/67.11; 455/69; 370/429; 370/468; 370/486; 709/231; 709/232; 714/748
(58) Field of Classification Search
None
See application file for complete search history.

(56) References Cited

U.S. PATENT DOCUMENTS

| | | | | |
|---|---|---|---|---|
| 7,012,902 B2* | 3/2006 | Omi et al. | ................... | 370/310.1 |
| 7,489,629 B2* | 2/2009 | Ye et al. | ........................ | 370/230 |
| 7,558,869 B2* | 7/2009 | Leon et al. | ..................... | 709/231 |
| 7,707,303 B2* | 4/2010 | Albers et al. | .................. | 709/231 |
| 7,733,830 B2* | 6/2010 | Curcio et al. | ................. | 370/333 |
| 2007/0250761 A1* | 10/2007 | Bradley et al. | ............. | 715/500.1 |
| 2009/0052392 A1* | 2/2009 | Sumasu et al. | ................ | 370/331 |
| 2010/0031110 A1* | 2/2010 | Seok et al. | ..................... | 714/748 |

FOREIGN PATENT DOCUMENTS

JP 2004-032204 A 1/2004

OTHER PUBLICATIONS

[No Author Listed], 3rd Generation Partnership Project. Global System for Mobile Communcations. Mar. 2005, V.2.0.0, pp. 1-77.

* cited by examiner

*Primary Examiner* — Nay A Maung
*Assistant Examiner* — Alejandro Rivero
(74) *Attorney, Agent, or Firm* — Wolf, Greenfield & Sacks, P.C.

(57) ABSTRACT

There is provided an information processing apparatus including a communication unit that transmits content to a communication terminal connected via a network and a control unit that controls transmission of the content by the communication unit. The control unit causes the communication unit to transmit a first file containing the content for a time corresponding to a communication disabled time of the communication terminal in response to a transmission request of the content from the communication terminal and causes the communication unit to transmit a second file to be transmitted subsequent to the first file at a transmission predetermined time obtained by adding the communication disabled time of the communication terminal to a transmission time of the first file.

11 Claims, 9 Drawing Sheets

TRANSMITTING CONTENT CORRESPONDING TO A TIME OF DISABLED COMMUNICATIONS

CROSS REFERENCE TO RELATED APPLICATIONS

The present application claims priority under 35 U.S.C. § 119 to Japanese Patent Application No. JP 2009-186790, filed in the Japan Patent Office on Aug. 11, 2009, the entire contents of which are incorporated herein by reference.

BACKGROUND OF THE INVENTION

1. Field of the Invention

The present invention relates to an information processing apparatus, an information processing method, a program, and a communication terminal, and in particular, relates to an information processing apparatus that transmits and receives television programs, an information processing method, a program, and a communication terminal.

2. Description of the Related Art

In recent years, communication terminals such as mobile phones on which a function to reproduce music, video and the like by communication terminals such as mobile phones is mounted have been developed and commercially available. Like a computer, a communication terminal can also establish connection to the Internet and perform information processing, and content such as music and video can be received by a streaming system from a streaming server set up on the Internet by using such a communication terminal.

To reproduce a file received from a streaming server set up on the Internet by a communication terminal, the communication terminal needs a buffer memory having a certain capacity. Files received from the streaming server are accumulated in the buffer memory of the communication terminal to realize continuous reproduction by the files being sequentially reproduced.

However, issues below that arise make continuous reproduction by the communication terminal difficult:

(1) The communication environment of a place where a user having a communication terminal is located is not fixed and thus, sufficient communication performance is not obtainable so that a state where the file to be received next is not receivable continues. Accordingly, files accumulated in the buffer memory are used up, leading to the interruption of reproduction.

(2) Even if communication performance of a communication terminal is sufficient, access to a server becomes too much so that transmission from the server to the communication terminal becomes insufficient. Also in this case, like (1), files accumulated in the buffer memory are used up, leading to the interruption of reproduction.

Thus, a technology that delivers image data without loss to a communication terminal by switching (handover) base stations communicating with the communication terminal even if a communication line is temporarily cut off is disclosed (for example, Japanese Patent Application Laid-Open No. 2004-32204).

SUMMARY OF THE INVENTION

However, according to Japanese Patent Application Laid-Open No. 2004-32204, there is a possibility of the interruption of reproduction if the communication terminal is in a state where files are not receivable for reasons other than handover. Further, there is an issue that it is difficult to solve the issue of communication performance in (1) and at the same time, to solve the issue when access to the server becomes too much in (2).

In light of the foregoing, it is desirable to provide a novel and improved information processing apparatus capable of preventing the interruption of content reproduction due to an increase in load of a content delivery server or degradation in communication performance of a communication terminal, an information processing method, a program, and a communication terminal.

According to an embodiment of the present invention, there is provided an information processing apparatus including a communication unit that transmits content to a communication terminal connected via a network and a control unit that controls transmission of the content by the communication unit. The control unit causes the communication unit to transmit a first file containing the content for a time corresponding to a communication disabled time of the communication terminal in response to a transmission request of the content from the communication terminal and causes the communication unit to transmit a second file to be transmitted subsequent to the first file at a transmission predetermined time obtained by adding the communication disabled time of the communication terminal to a transmission time of the first file.

The control unit may include a calculation unit that calculates a file size of the content contained in the first file in accordance with the communication disabled time of the communication terminal.

The calculation unit may set the file size of the content to the file size equal to or greater than the communication disabled time of the communication terminal.

The control unit may include a decision unit that decides the transmission predetermined time of the second file by adding a time length corresponding to the file size of the content contained in the first file calculated by the calculation unit to the transmission time of the first file.

The control unit may include a detection unit that detects a transmission number of times of files transmitted by the communication unit at predetermined intervals, and a determination unit that determines whether the transmission number of times of the files at the transmission predetermined time of the second file exceeds a predetermined threshold. If the transmission number of times of the files at the transmission predetermined time of the second file exceeds the predetermined threshold, the decision unit changes a time at which the transmission number of times is equal to or less than the predetermined threshold to the transmission predetermined time of the second file.

If the transmission number of times of the files at the transmission predetermined time of the second file exceeds the predetermined threshold, the decision unit may change the time at which the transmission number of times is equal to or less than the predetermined threshold within a predetermined time range prior to or subsequent to the transmission predetermined time to the transmission predetermined time of the second file.

If the time at which the transmission number of times is equal to or less than the predetermined threshold within the predetermined time range prior to or subsequent to the transmission predetermined time is changed to the transmission predetermined time of the second file by the decision unit, the calculation unit may change the transmission time of the content contained in the first file in accordance with the transmission predetermined time of the second file.

The communication disabled time of the communication terminal is a maximum value of time widths in which the communication terminal is disabled to communicate within a predetermined time.

According to another embodiment of the present invention, there is provided an information processing method which includes the steps of transmitting a first file containing content for a time corresponding to a communication disabled time of a communication terminal in response to a transmission request of the content from the communication terminal connected via a network; and transmitting a second file to be transmitted subsequent to the first file at a transmission predetermined time obtained by adding the communication disabled time of the communication terminal to a transmission time of the first file.

According to another embodiment of the present invention, there is provided a program for causing a computer to function as an information processing apparatus, including a communication unit that transmits content to a communication terminal connected via a network, and a control unit that causes the communication unit to transmit a first file containing the content for a time corresponding to a communication disabled time of the communication terminal in response to a transmission request of the content from the communication terminal and causes the communication unit to transmit a second file to be transmitted subsequent to the first file at a transmission predetermined time obtained by adding the communication disabled time of the communication terminal to a transmission time of the first file.

According to another embodiment of the present invention, there is provided a communication terminal, including a communication unit that notifies a server connected via a network of a communication disabled time detected based on field intensity received from a base station at predetermined intervals and a transmission request of content, and a control unit that controls reproduction of a file containing the content for a time corresponding to the communication disabled time transmitted from the server. If a remaining amount of reproduction of the files received prior to a transmission predetermined time obtained by adding the communication disabled time to a transmission time of the file is smaller than a predetermined threshold, the control unit causes the communication unit to notify the server of a transmission request of the next file.

According to the present invention as described above, the interruption of content reproduction due to an increase in load of a content delivery server or degradation in communication performance of a communication terminal can be prevented.

DETAILED DESCRIPTION OF THE EMBODIMENT(S)

Figure 1:
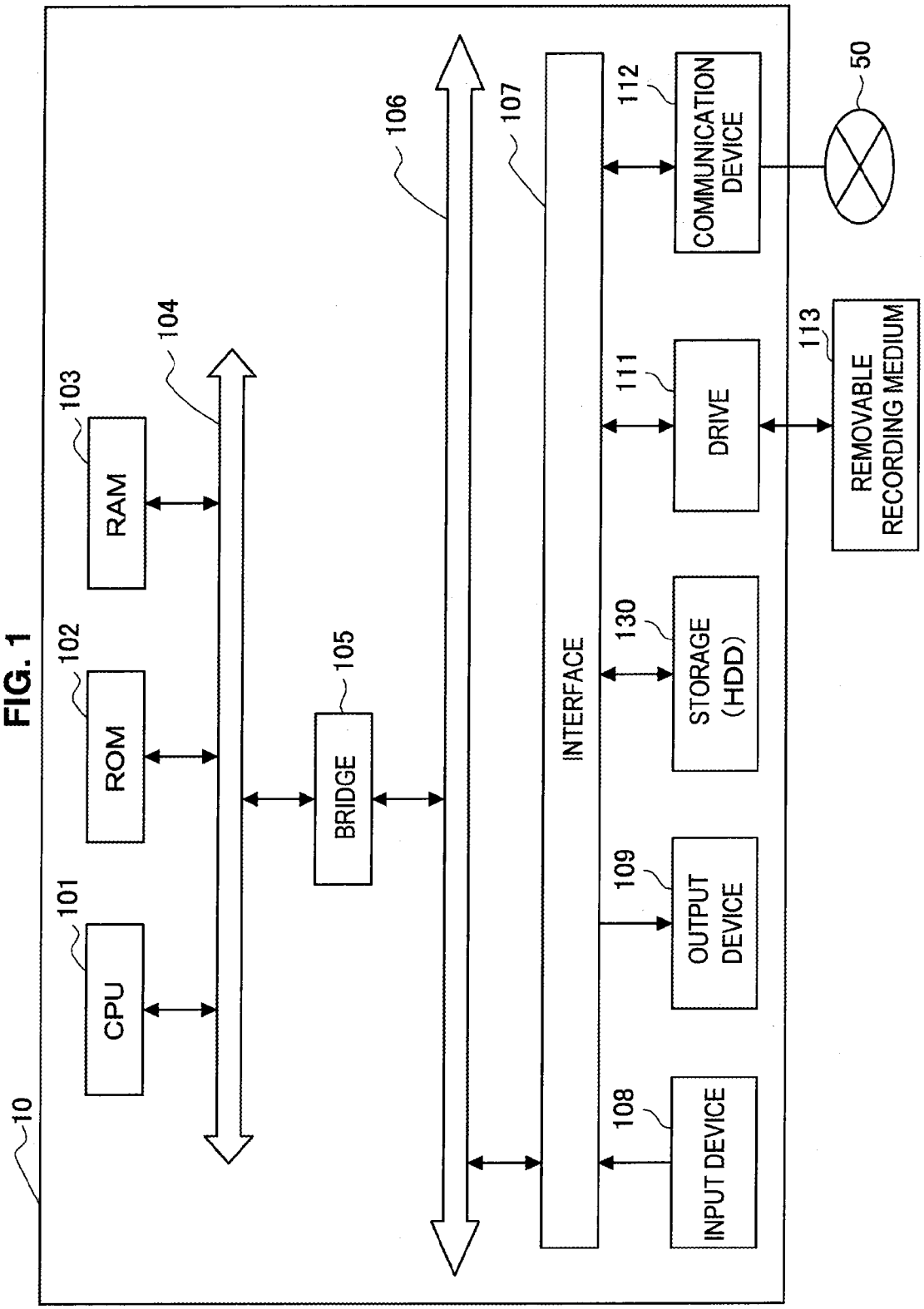
FIG. 1 is a block diagram showing a hardware configuration of a server according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"DETAILED DESCRIPTION OF THE EMBODIMENT" will be described according to the order shown below:
[1] Purpose of the Present Embodiment
[2] Overview of Information Processing System
[3] Function Configuration of Server and Communication Terminal
[4] Details of Processing of Information Processing Method in Information Processing System
[4-1] Details of Operation of Communication Terminal
[4-2] Details of Operation of Server

[1] Purpose of the Present Embodiment

First, the purpose of an embodiment of the present invention will be described. In recent years, communication terminals such as mobile phones on which a function to reproduce music, video and the like by communication terminals such as mobile phones is mounted have been developed and commercially available. Like a computer, a communication terminal can establish connection to the Internet and perform information processing and content such as music and video can be received by a streaming system from a streaming server set up on the Internet by using such a communication terminal.

To reproduce files received from a streaming server set up on the Internet by a communication terminal, the communication terminal needs a buffer memory having a certain capacity. Files received from the streaming server are accumulated in the buffer memory of the communication terminal to realize continuous reproduction by the files being sequentially reproduced.

However, issues below that arise make continuous reproduction by the communication terminal difficult:

(1) The communication environment of a place where a user having a communication terminal is located is not fixed and thus, sufficient communication performance is not obtainable so that a state where the file to be received next is not receivable continues. Accordingly, files accumulated in the buffer memory are used up, leading to the interruption of reproduction.

(2) Even if communication performance of a communication terminal is sufficient, access to a server becomes too much so that transmission from the server to the communication terminal becomes insufficient. Also in this case, like (1), files accumulated in the buffer memory are used up, leading to the interruption of reproduction.

Thus, a technology that delivers image data without loss to a communication terminal by switching (handover) base stations communicating with the communication terminal even if a communication line is temporarily cut off is disclosed.

According to the technology, however, there is a possibility of the interruption of reproduction if the communication terminal is in a state where files are not receivable for reasons other than handover. Further, there is an issue that it is difficult to solve the issue of communication performance in (1) and at the same time, to solve the issue when access to the server becomes too much in (2).

Then, an information processing system 1 according to the present embodiment has been made in view of the above circumstances. According to the information processing system 1 in the present embodiment, it becomes possible to prevent the interruption of content reproduction due to an increase in load of a content delivery server or degradation in communication performance of a communication terminal. Content in the present embodiment is data that can be reproduced by a communication terminal and is data that includes video data and audio data.

[2] Overview of Information Processing System

Next, an overview of the information processing system 1 in the present embodiment will be described. The information processing system 1 includes, for example, a server 10 that is an information processing apparatus to input and record a content file of a television program or the like and a communication terminal 20 that receives and reproduces a content file of a television program or the like from the server 10. The server 10 and the communication terminal 20 are connected via a network, and the network is constituted by, for example, a public network such as the Internet, a telephone network, and a satellite communication network or a private network such as WAN, LAN, and IP-VPN and it makes no difference whether the network is constituted by wire or by radio.

The communication terminal 20 is an information processing terminal equipped with a reproducer such as a mobile phone, PDA (Personal Digital Assistant), and small PC (Personal Computer). The server 10 encodes content such as a television program at predetermined constant intervals (for example, at 1-minute intervals) to record the content as a file. Then, in response to a transmission request from the communication terminal 20, the server 10 transmits a file for a time calculated according to a predetermined calculation method to the communication terminal 20. The server 10 adds a reproduction time of the file and a reproduction order thereof to the header of the file during transmission of the file to the communication terminal 20.

The server 10 communicates with a plurality of the communication terminals 20 to transmit content files such as television programs to each communication terminal. After transmitting files for a predetermined time in accordance with a transmission request from the communication terminal 20, the server 10 sets a transmission predetermined time at which the next file should be transmitted to the communication terminal 20. The server 10 adds the transmission predetermined times of the plurality of the communication terminals 20 and records the transmission amount at each transmission predetermined time. The communication terminal 20 accumulates a file received from the server 10 in the buffer memory. Then, files accumulated in the buffer memory are sequentially reproduced to realize continuous content reproduction by the communication terminal 20.

The communication terminal 20 also detects communication capability with base stations and the like periodically to record levels of the communication capability. The communication terminal 20 records a time width in which the recorded communication capability falls below predetermined communication capability as a communication disabled time. Then, the communication terminal 20 transmits the communication disabled time recorded on the server 10 to request transmission of content files. The communication disabled time to be transmitted to the server 10 is the maximum value of communication disabled times that occur in a predetermined time (for example, one hour).

The server 10 compares the maximum value of communication disabled times transmitted from the communication terminal 20 and a predetermined time to set the longer thereof as an initial transmission time. Then, the server 10 sets a transmission predetermined time at which a file for the initial transmission time should be transmitted next by adding a transmission time necessary for file transmission to the initial transmission time. The server 10 refers to the transmission amount at the transmission predetermined time set based on the communication disabled time of the communication terminal 20. Then, if the transmission amount exceeds a predetermined threshold, the server 10 detects a time at which the transmission amount does not exceed the predetermined threshold from times before or after the transmission predetermined time to set the time as a transmission predetermined time again.

Thus, the server 10 of the information processing system 1 transmits files for a time in accordance with the communication disabled time of the communication terminal 20 that receives files to the communication terminal 20 so that files for the communication disabled time are accumulated in the buffer memory of the communication terminal 20. Accordingly, even if a state where sufficient communication performance is not available on the side of the communication terminal 20 so that the next file is not receivable continues, the interruption of content reproduction can be prevented because files accumulated in the buffer memory will not be used up. Moreover, the server 10 sets transmission times by referring to the transmission amounts to the plurality of the communication terminals 20 and thus, the server 10 can be prevented from being disabled to transmit content to the communication terminal 20 due to excessive access to the server.

[3] Function Configuration of Server and Communication Terminal

In the foregoing, an overview of the information processing system 1 has been described. Next, the hardware configuration of the server 10 and the communication terminal 20 of the information processing system 1 will be described with reference to FIG. 1. Because the server 10 and the communication terminal 20 have almost the same hardware configuration, particularly the hardware configuration of the server 10 will be described.

The server 10 includes a CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 130, a drive 111, and a communication device 112.

The CPU 101 functions as an arithmetic processing unit and control unit and controls overall operations on the server 10 according to various programs. The CPU 101 may be a microprocessor. The ROM 102 stores programs, arithmetic parameters and the like used by the CPU 101. The RAM 103 temporarily stores programs used for execution by the CPU 101 and parameters appropriately changing during execution thereof. These units are mutually connected by the host bus 104 constituted by a CPU bus or the like.

The host bus 104 is connected to the external bus 106 like a PCI (Peripheral Component Interconnect/Interface) bus via the bridge 105. Incidentally, the host bus 104, the bridge 105, and the external bus 106 are not necessarily constituted separately and these functions may be implemented by a single bus.

The input device 108 is constituted by an input means for a user to input information such as a mouse, keyboard, touch-panel, button, microphone, switch, and lever and an input control circuit or the like that generates an input signal based on input by the user and outputs the input signal to the CPU 101. The user of the server 10 can input various kinds of data or provide processing operation instructions to the server 10 by operating the input device 108.

The output device 109 is constituted by a display device such as a CRT (Cathode Ray Tube) display device, LCD (Liquid Crystal Display) device, OLED (Organic Light Emitting Display) device, and lamp and an audio output device such as a speaker and headphone. The output device 109 outputs, for example, reproduced content. More specifically, the display device displays various kinds of information such as reproduced video data as text or images. On the other hand, the audio output device converts reproduced audio data or the like into audio and outputs the audio.

The storage device 130 is a device for data storage constituted as an example of storage unit of the server 10 according to the present embodiment and can contain a storage medium, a recording device that records data in the storage medium, a read-out device that reads data from the storage medium, and a deletion device that deletes data recorded in the storage medium. The storage device 130 is constituted by, for example, an HDD (Hard Disk Drive). The storage device 130 drives a hard disk and stores programs executed by the CPU 101 and various kinds of data.

The drive 111 is a reader writer for storage medium and is contained in the server 10 or attached thereto externally. The drive 111 reads information recorded in a removable storage medium 113 such as an inserted magnetic disk, optical disk, magneto-optical disk, or semiconductor memory and outputs the information to the RAM 103.

The communication device 112 is a communication interface constituted by, for example, a communication device to connect to a communication network 50. The communication device 112 may be a wireless LAN (Local Area Network) compatible communication device, wireless USB compatible communication device, or wire communication device that performs communication by wire. The communication device 112 transmits/receives various kinds of data such as setup information to/from the communication terminal 20 via the communication network 50.

Figure 2:
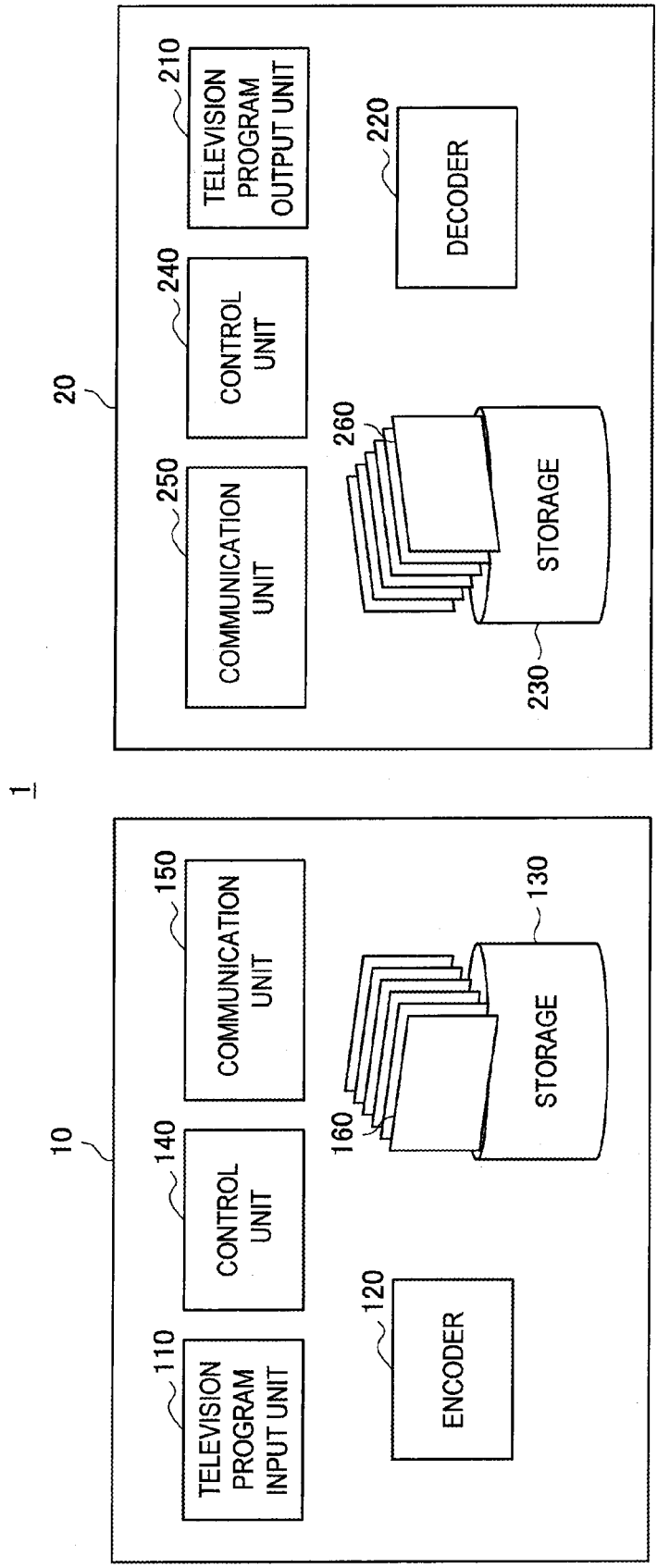
FIG. 2 is a block diagram showing a function configuration of the server and a communication terminal according to the embodiment.

In the foregoing, the hardware configuration of the server 10 has been described. Next, the function configuration of the server 10 and the communication terminal 20 will be described with reference to FIG. 2. FIG. 2 is a block diagram showing the function configuration of the server 10 and the communication terminal 20. As shown in FIG. 2, the server 10 mainly includes a television program input unit 110, an encoder 120, a control unit 140, a communication unit 150, and the storage device 130.

The television program input unit 110 has a function to input an audio/video signal of a television program from another device via a network or broadcast waves. The television program input unit 110 provides the input audio/video signal to the encoder 120. In the present embodiment, an audio/video signal input into the server 10 is assumed to be an audio/video signal of a television program, but the audio/video signal is not limited to such an example and may be an audio/video signal of things other than a television program.

The encoder 120 has a function to encode the audio/video signal provided from the television program input unit 110 to output digital data.

The control unit 140 records the digital data encoded by the encoder 120 as a file in the storage device 130 at predetermined intervals. A file recorded in the storage device 130 is a file of content such as a television program sequentially delivered from the server 10 to the plurality of the communication terminals 20 before being reproduced by the communication terminal 20.

A file recorded in the storage device 130 is created, for example, on a minute-by-minute basis. The control unit 140 adds the recording time and reproduction order to the header of a file 160 and then records the file 160 in the storage device 130. The control unit 140 also transmits the file 160 recorded in the storage device 130 to the communication terminal 20 via the communication unit 150. Each time the file 160 is transmitted to the communication terminal 20, the control unit 140 records the transmission time and the file length of the file 160 to draw up a transmission schedule shown in FIG. 4.

Figure 4:
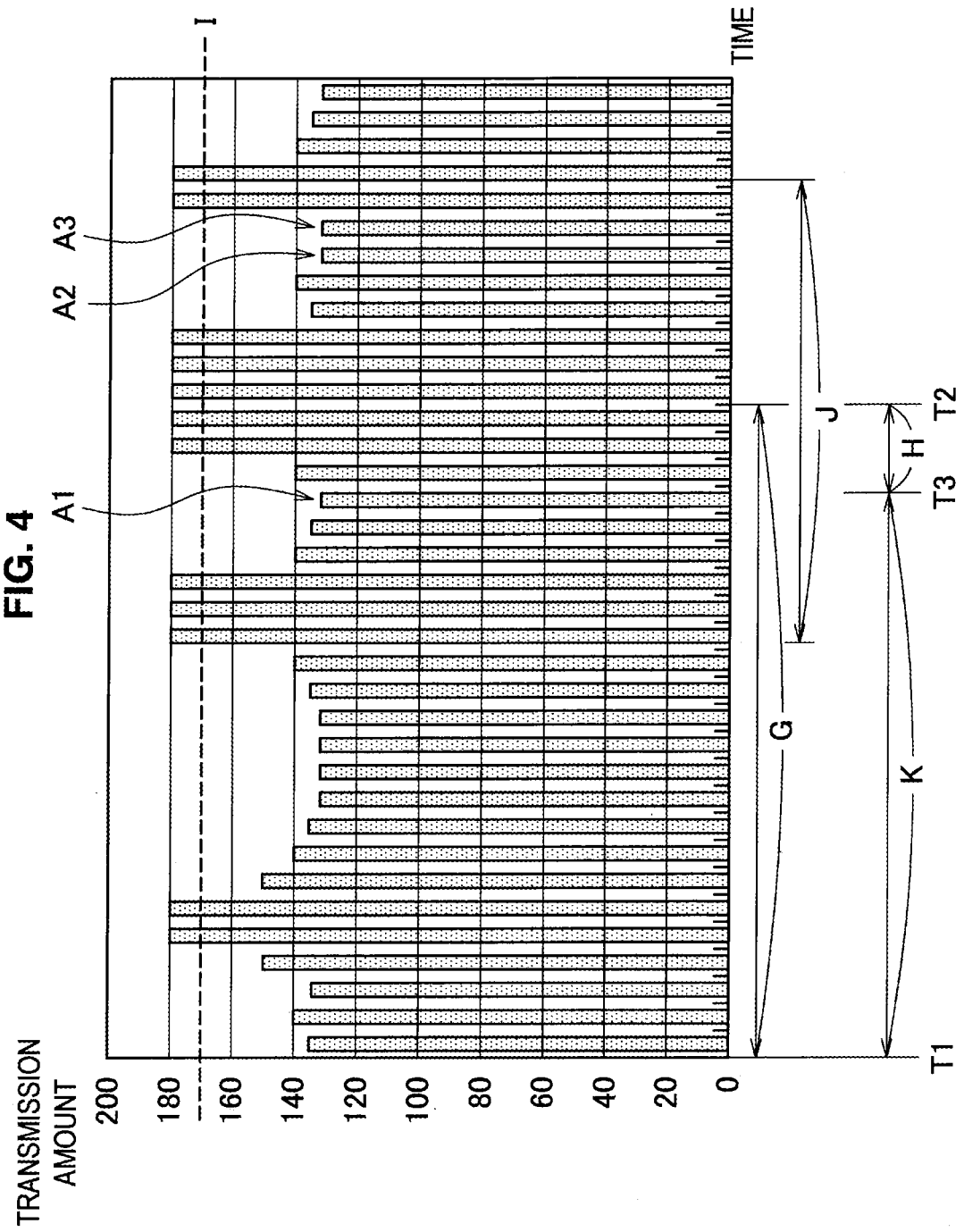
FIG. 4 is an explanatory view exemplifying a transmission schedule according to the embodiment.

The transmission schedule shown in FIG. 4 records, for example, transmission numbers of times (transmission amounts) every 10 seconds or so. If, for example, as shown in FIG. 4, the transmission number of times (transmission amount) of 170 is set as a threshold, there is a possibility of degradation in communication performance due to an increase in load of the server 10 when the transmission number of times exceeds 170. Thus, it is necessary for the server 10 to plan a transmission schedule within the transmission number of times of 170.

In response to a transmission request of content from the communication terminal 20, the control unit 140 causes the communication unit 150 to transmit a file (first file) containing content for a time corresponding to a communication disabled time of the communication terminal 20. Then, after the first file transmitted before being transmitted, the control unit 140 causes the communication unit 150 to transmit a second file to be transmitted next at a transmission predetermined time calculated by adding the communication disabled time of the communication terminal 20 to the transmission time of the first file. The control unit 140 is an example of the above CPU 101.

Figure 5:
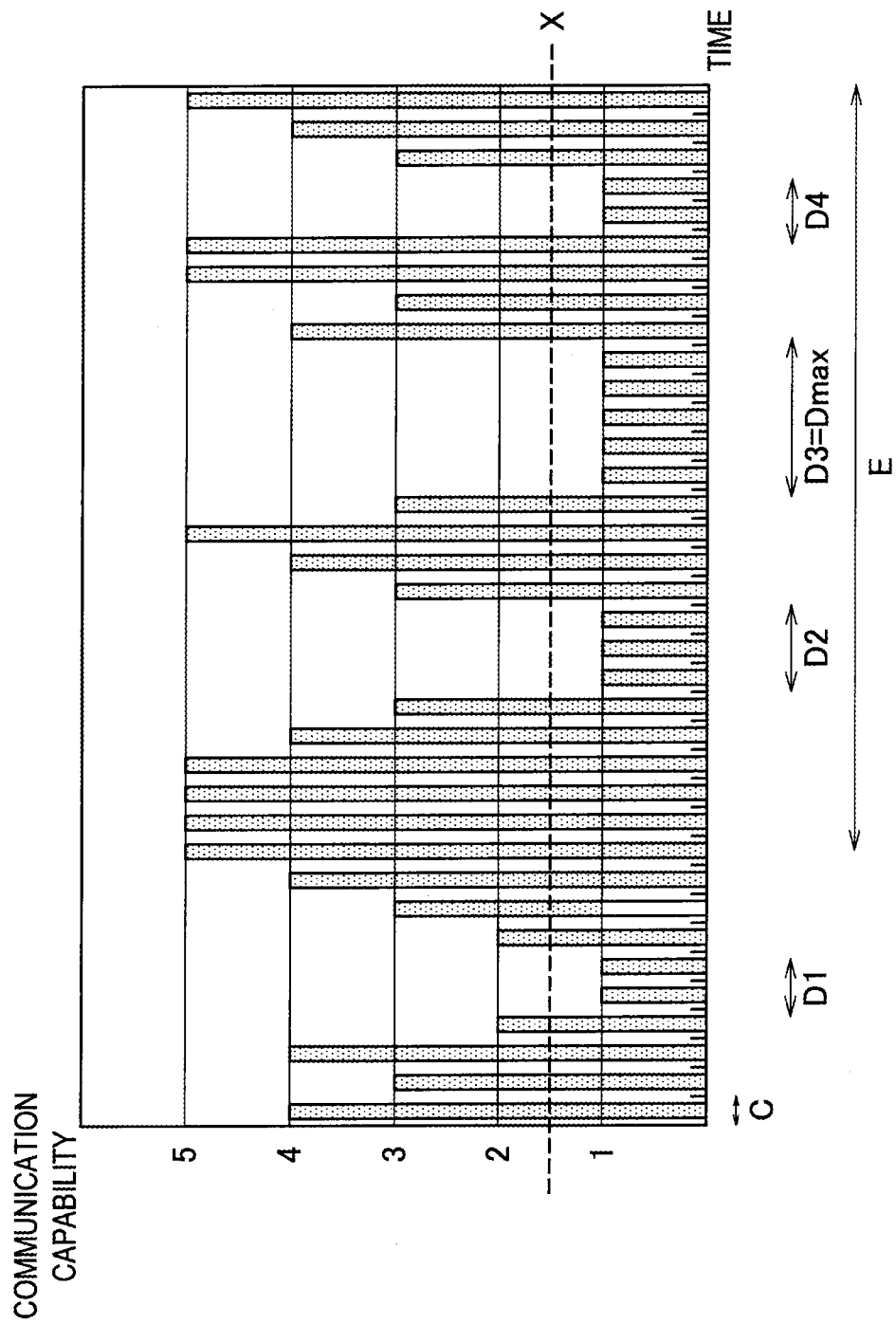
FIG. 5 is an explanatory view illustrating a communication disabled time according to the embodiment.

The communication disabled time is a time in which communication of the communication terminal 20 disabled. The server 10 receives, along with a transmission request of content, the communication disabled time from the communication terminal 20. If, for example, the communication terminal 20 periodically detects communication capability to base stations or the like and records the level of communication capability, the communication terminal 20 records a time width in which the recorded communication capability falls below predetermined communication capability as a communication disabled time. Assume, for example, as shown in FIG. 5, that communication capability is detected every predetermined time C (for example, 1 minute). The communication terminal 20 records a time width in which the communication capability falls below predetermined communication capability X as a communication disabled time.

If, for example, as shown in FIG. 5, D1, D2, D3, and D4 are recorded as communication disabled times, a maximum value Dmax of communication disabled times that occurred within a fixed time (E) may be detected to set the maximum value Dmax as the communication disabled time. Detection of a communication disabled time by the communication terminal 20 will be described in detail later.

The server 10 notified of the communication disabled time by the communication terminal 20 along with a transmission request decides, as described above, the transmission time of content contained in the file to be transmitted and the transmission predetermined time at which the file should be transmitted. The server 10 refers to the transmission amount at the transmission predetermined time when deciding the transmission predetermined time. Then, if the transmission amount exceeds a predetermined threshold, the server 10 detects a time at which the transmission amount does not exceed the predetermined threshold from times before or after the transmission predetermined time to set the time as a transmission predetermined time again.

Figure 3:
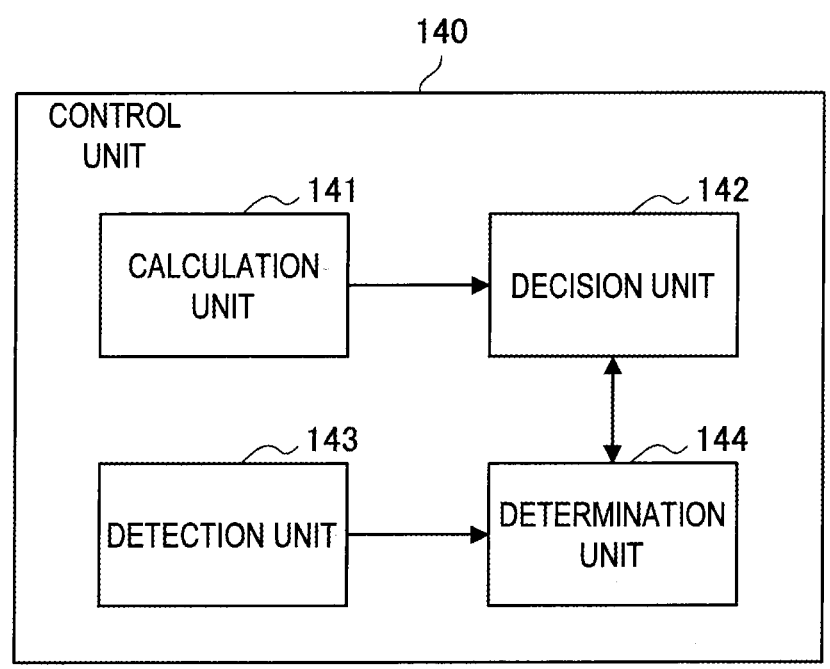
FIG. 3 is a block diagram showing details of a control unit of the server according to the embodiment.

Details of the control unit 140 will be described with reference to FIG. 3. FIG. 3 is a block diagram showing details of the control unit 140. As shown in FIG. 3, the control unit 140 mainly includes a calculation unit 141, a decision unit 142, a detection unit 143, and a determination unit 144. The calculation unit 141 has a function to calculate the file size of content contained in the file to be transmitted to the communication terminal 20 in accordance with the communication disabled time of the communication terminal 20. The calculation unit 141 sets the file size of content contained in the file to be transmitted to a transmission time equal to or greater than the communication disabled time of the communication terminal 20. If the transmission time of content is predetermined, the predetermined time and the communication disabled time of the communication terminal 20 may be compared to set a file size corresponding to the longer thereof as the file size of content.

The decision unit 142 has a function to decide a transmission predetermined time of the second file by adding the time length corresponding to the file size of content contained in the first file calculated by the calculation unit 141 to the transmission time of the first file. The transmission predetermined time decided by the decision unit 142 will be described using the transmission schedule shown in FIG. 4. First, it is assumed that the time at which the first file is transmitted is T1. Then, a time T2 obtained by adding the transmission time (set as a G time) of the time length corresponding to the file size of content calculated by the calculation unit to the time T1 is calculated.

Returning to FIG. 3, the detection unit 143 has a function to detect the transmission number of times of files transmitted by the communication unit 150 at predetermined intervals. As described above, the detection unit 143 creates the transmission schedule shown in FIG. 4 by recording the transmission number of times of detected files. The determination unit 144 has a function to determine whether the transmission number of times of files at the transmission predetermined time of the file to be transmitted next exceeds a predetermined threshold.

In the transmission schedule shown in FIG. 4, for example, the determination unit 144 determines whether the transmission number of times of files at the transmission predetermined time (time T2) decided by the decision unit 142 exceeds the predetermined threshold (170). As shown in FIG. 4, the determination unit 144 determines that the transmission number of times of files at the point in time of the transmission predetermined time T2 decided by the decision unit 142 exceeds 170. The decision unit 142 to which a determination result has been provided by the determination unit 144 decides a time at which the transmission number of times is equal to or less than the predetermined threshold in a predetermined time range (for example, a J time) before and after the transmission predetermined time T2 as a transmission predetermined time T3 of the file to be transmitted next.

Times at which the transmission number of times is minimal within a predetermined time range (J time) prior to or subsequent to the transmission predetermined time T2 are, for example, times A1, A2, and A3. Assume, for example, that the time A1 prior to the time T2 is set as the transmission predetermined time T3. In this case, the previous file (first file) is transmitted at the time T1 and the next file (second file) is transmitted at the time T3. At this point, the control unit 140 adds "1" to the transmission number of times at the time A1.

The calculation unit 141 may change the file size of content to be transmitted at the time T1 in accordance with the transmission predetermined time decided by the decision unit 142. If, for example, the time T3, which is prior to the time T2 set first, is decided as the transmission predetermined time, the file size may be changed from the G time calculated in advance to that of content for a time width (K time) from T1 to T3 before being transmitted to the communication terminal 20.

If a time subsequent to the time T2 set first is decided as the transmission predetermined time, the file size may be changed to that of content for a time width longer than the G time calculated in advance before being transmitted to the communication terminal 20. Content contained in the file to be transmitted at the point in time of the time T1 needs to be content for a time longer than the K time. Thus, when the transmission predetermined time is moved forward in time, the file size of content calculated in advance may not be changed. When the transmission predetermined time is moved backward in time, on the other hand, a file containing content for a time longer than the time of content calculated in advance needs to be transmitted to the communication terminal 20.

Accordingly, by transmitting content for a time longer than the time in which communication of the communication terminal 20 is disabled, the interruption of reproduction without being able to receive a file due to disabled communication on the side of the communication terminal 20 can be prevented. Further, the server can be prevented from being disabled to transmit due to an excessive transmission amount at a time when a file is transmitted next time.

The communication unit 150 has a function to transmit content to the communication terminal 20 connected via a network under the control of the control unit 140. The communication unit 150 is an example of the communication device 112 described above. In the foregoing, the function configuration of the server 10 has been described. Next, the function configuration of the communication terminal 20 will be described.

As shown in FIG. 2, the communication terminal 20 includes a television program output unit 210, a decoder 220, a storage device 230, a control unit 240, and a communication unit 250.

The communication unit 250 makes a position notification toward base stations or the like at predetermined intervals to receive Ack as a response from the base stations. When the Ack is received, information such as electric field intensity (intensity of radio waves) is received. The control unit 240 compares intensity of radio waves (hereinafter, referred to as field intensity) received by the communication unit 250 with predetermined field intensity. Then, if the received field intensity is weaker than predetermined field intensity X, the control unit 240 disables communication. Then, when the field intensity exceeds the field intensity X, the control unit 240 records a time width in which communication was disabled as a communication disabled time D1.

As shown in FIG. 5, the control unit 240 repeats detection work of communication disabled time to record communication disabled times D1, D2, ..., Dn. Then, the control unit 240 sets the maximum value of communication disabled times that occurred in a predetermined time (for example, an E time) as Dmax. If a program reproduction button is pressed in accordance with a user operation, the control unit 240 transmits the maximum value Dmax of communication disabled times to the server 10 via the communication unit 250 along with a transmission request of a file containing content.

The communication unit 250 receives a file containing content transmitted from the server 10 and a file 260 concerned is stored in the storage device 230 by the control unit 240. When a program file is stored in the storage device 230, the control unit 240 immediately issues instructions to the decoder 220 to reproduce the file. Then, the program file is reproduced by the television program output unit 210.

The control unit 240 also detects a remaining time of the file of content stored in the storage device 230. Then, the control unit 240 compares the detected remaining time amount of content with a predetermined value (for example, an L time). If, as a result of comparison, the control unit 240 determines that the remaining time amount of content is smaller than the L time, the control unit 240 transmits the newly detected Dmax value to the server 10 to request transmission of the next file.

The communication unit 250 receives a file of content transmitted from the server 10 to store the file in such a way that the file continues to files stored previously in the storage device 230. In the foregoing, the function configuration of the communication terminal 20 has been described.

Figure 6:
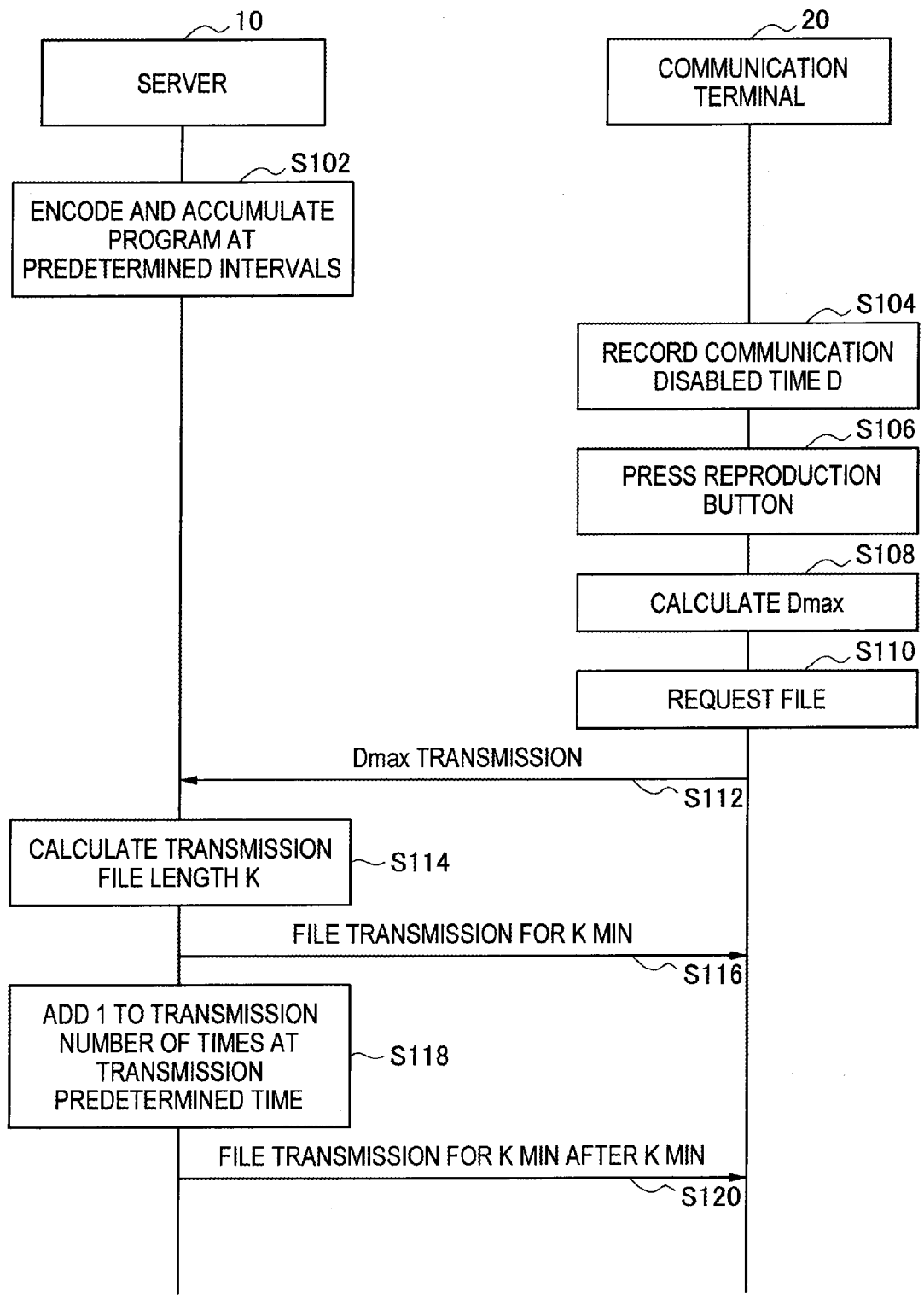
FIG. 6 is a timing chart showing an information processing method in an information processing system according to the embodiment.

[4] Details of Processing of Information Processing Method in Information Processing System Next, the information processing method in the information processing system 1 will be described with reference to FIG. 6. FIG. 6 is a timing chart showing the information processing method in an information processing system. As shown in FIG. 6, the server 10 first encodes a program (audio video signal) input from the television program input unit 110 through the encoder 120 at predetermined intervals to accumulate the encoded program in the storage device 130 (S102).

The communication terminal 20 periodically records a communication disabled time D (S104). Recording of the communication disabled time D in step S104 will be described in detail later. Then, a reproduction button provided with the communication terminal 20 is pressed in accordance with a user operation (S106). When the reproduction button is pressed in step S106, the maximum value Dmax of the communication disabled times D is calculated (S108). Then, along with a file transmission request (S110), Dmax calculated in step S108 is transmitted to the server 10 (S112).

The server 10 that receives the file transmission request in step S110 and Dmax in step S112 calculates a transmission file length K of content (S114). In step S116, the server 10 decides the transmission predetermined time at which a file is transmitted next time. Then, the server 10 transmits a file containing content for K minute calculated in step S114 (S116). The calculation of the transmission file length in step S114 and the decision of the transmission predetermined time will be described in detail later.

Then, the server 10 adds "1" to the transmission number of times at the transmission predetermined time (S118). Then, the server 10 transmits a file for K minute after K minute to the communication terminal 20 (S120). The information processing method in the information processing system 1 has been described.

[4-1] Details of Operation of Communication Terminal

Figure 7:
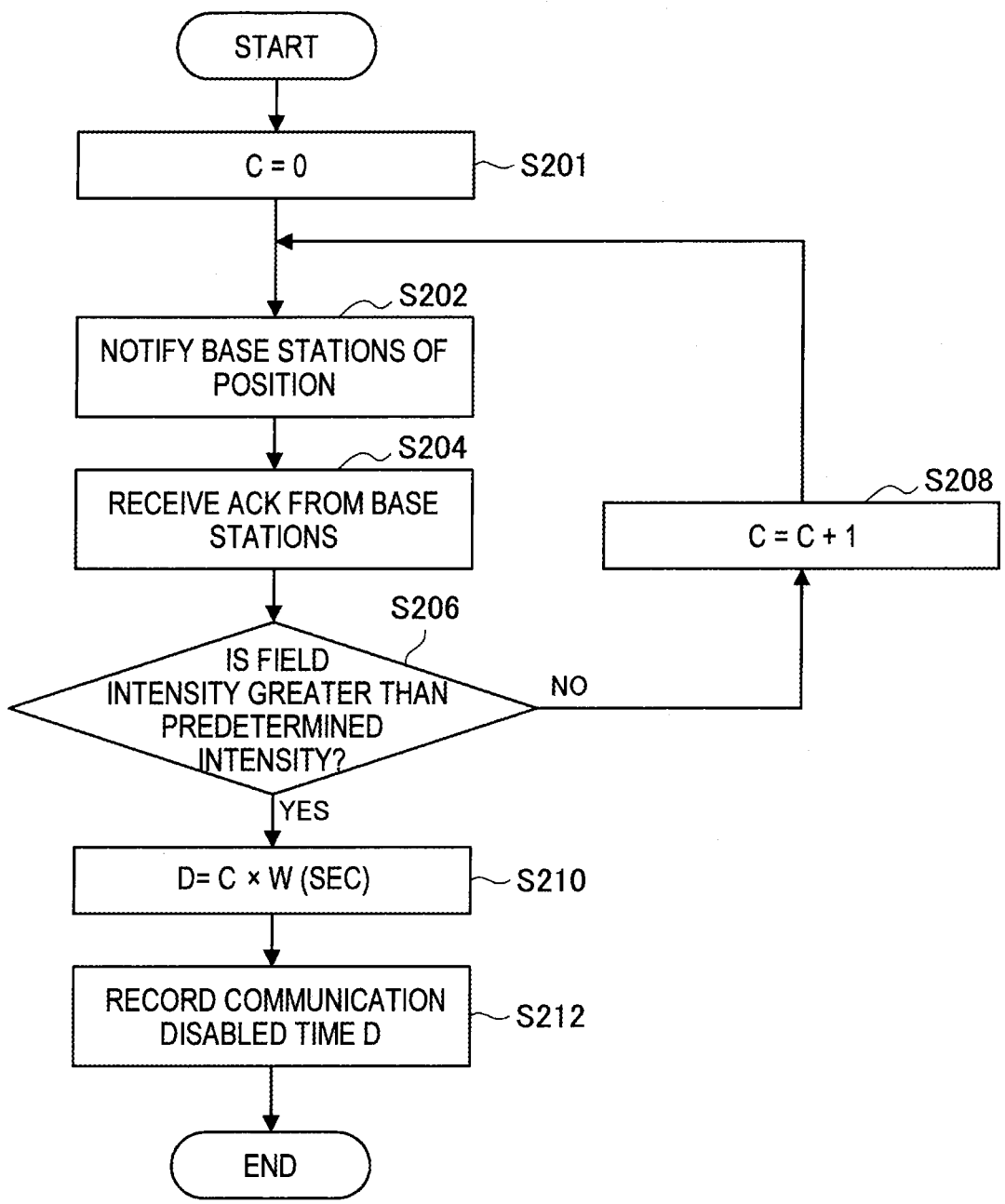
FIG. 7 is a flow chart showing details of an operation of the communication terminal according to the embodiment.

Next, details of operation on the communication terminal 20 will be described with reference to FIG. 7. Particularly, recording of communication disabled times on the communication terminal 20 will be described below. First, the control unit 240 of the communication terminal 20 sets C=0 (S201). Then, the communication unit 250 of the communication terminal 20 notifies base stations and the like of the local position (S202). The communication unit 250 of the communication terminal 20 that has notified base stations and the like of the local position in step S202 receives Ack from base stations (S204). When Ack is received in step S204, as described above, information such as field intensity is also received.

The control unit 240 determines whether the field intensity received in step S204 is greater than predetermined intensity (S206). If the field intensity is determined to be smaller than the predetermined intensity in step S206, the control unit 240 performs processing in step S208. If the field intensity is determined to be greater than the predetermined intensity in step S206, the control unit 240 performs processing in step S210 and thereafter.

If the field intensity is determined to be smaller than the predetermined intensity, C+1 is set to C in step S208 to repeat processing in step S202. By repeating processing in step S202 to step S206, the communication terminal 20 will periodically (for example, every W second) determine field intensity.

If the field intensity is determined to be greater than the predetermined intensity in step S206, the control unit 240 sets C×W (sec) to the communication disabled time D, where C is the count of repeating step S202 to step S206 and W is an execution interval of preset field intensity determination processing. Then, the communication terminal 20 records the communication disabled time D (S212).

The communication terminal 20 may perform recording processing of communication disabled times when file transmission is requested from the server 10 or periodically perform recording processing of communication disabled times. When file transmission is requested, communication disabled times may be recorded at predetermined intervals within a predetermined time. In such a case, the maximum value Dmax of communication disabled times within a predetermined time is transmitted to the server 10 as the communication disabled time. In the foregoing, recording of communication disabled times on the communication terminal 20 has been described.

[4-2] Details of Operation of Server

Figure 8:
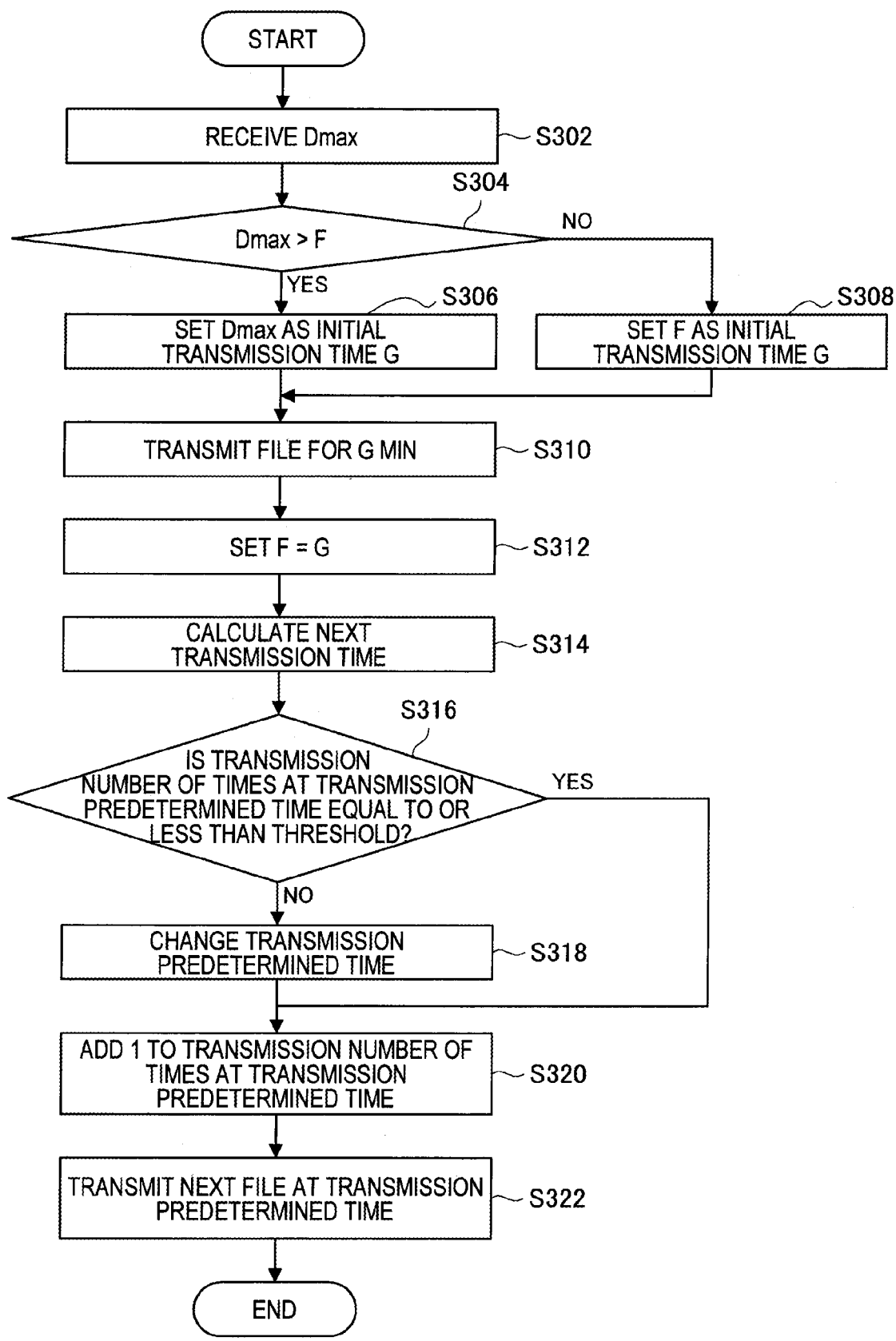
FIG. 8 is a flow chart showing details of the operation of the server according to the embodiment.

Next, details of operation on the server 10 will be described with reference to FIG. 8. Particularly, the calculation of the length of a transmission file to be transmitted to the communication terminal 20 and the decision of a transmission predetermined time on the server 10 will be described in detail below. First, the server 10 receives the above Dmax from the communication terminal 20 together with a file transmission request (S302). Then, the server 10 compares the Dmax time received in step S302 and a preset F time (S304). The F time compared with Dmax in step S304 is a time preset for transmission of files at predetermined intervals after a file transmission request from the communication terminal 20.

If, as a result of comparison in step S304, the server 10 determines that Dmax is larger than F, the server 10 sets Dmax as an initial transmission time G (S306). If, as a result of comparison in step S304, the server 10 determines that Dmax is smaller than F, the server 10 sets F as an initial transmission time G (S308).

Then, the server 10 transmits a file for G minute (S310). Then, the server 10 sets G to F (F=G) (S312).

Then, the server 10 calculates the next transmission time based on the file length of the file for G minute transmitted in step S310 (S314). The transmission predetermined time calculated in step S314 is calculated by adding a time obtained by adding a time necessary for transmission to the file length of the file for G minute transmitted in step S310 to the transmission time at which the file is transmitted in step S310.

Then, the server 10 determines whether the transmission number of times at the transmission predetermined time calculated in step S314 is equal to or less than a threshold (S316). If the server 10 determines in step S316 that the transmission number of times at the transmission predetermined time is not equal to or less than the threshold, the server 10 changes the transmission predetermined time (S318). If the server 10 determines in step S316 that the transmission number of times at the transmission predetermined time is equal to or less than the threshold, the server 10 performs processing in step S320. In step S318, the server 10 detects a time at which the transmission number of times is equal to or less than the threshold within a predetermined time prior to or subsequent to the transmission predetermined time calculated in step S314 and changes the time to a time at which the next file should be transmitted.

Then, the server 10 adds "1" to the transmission number of times at the transmission predetermined time of the file to be transmitted next (S320). Subsequently, the server 10 transmits the file to be transmitted next at the transmission predetermined time calculated in step S314 or at the transmission predetermined time changed in step S318 (S322). The file length to be transmitted in step S322 is a file length for G minute.

Figure 9:
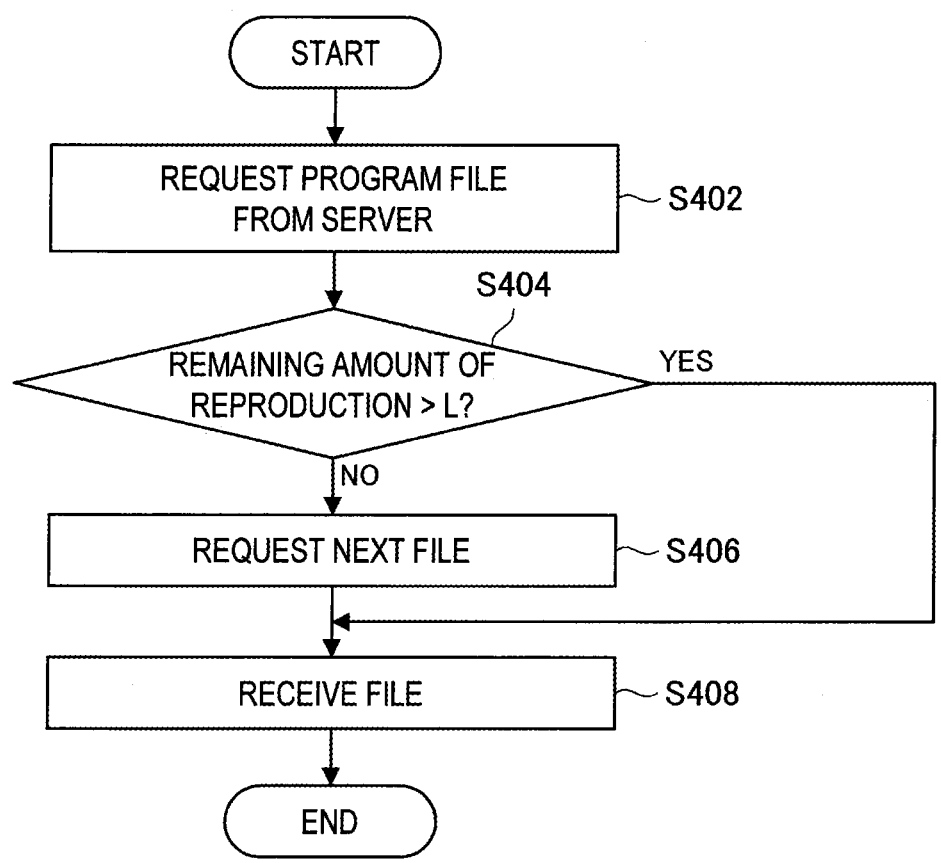
FIG. 9 is a flow chart showing timing for the communication terminal according to the embodiment to request a next file.

The timing for the communication terminal 20 to request the next file will be described with reference to FIG. 9. As shown in FIG. 9, after requesting a program file from the server 10 (S402), the communication terminal 20 determines whether the remaining time of the file to be reproduced is longer than a predetermined time L (S404).

If the communication terminal 20 determines that the remaining time of the file to be reproduced is shorter than the predetermined time L, the communication terminal 20 requests the next file from the server 10 (S406) and receives the file (S408). If the communication terminal 20 determines that the remaining time of the file to be reproduced is longer than the predetermined time L in step S404, the communication terminal 20 receives a file at the transmission predetermined time set by the server 10 (S408). In the foregoing, the timing for the communication terminal 20 to request the next file has been described.

According to the information processing system 1 in the above embodiment, a file (first file) containing content for a time corresponding to a communication disabled time transmitted from the communication terminal 20 is transmitted in response to a transmission request of content from the communication terminal 20 and after the first file is transmitted, a file (second file) containing content for the time corresponding to the communication disabled time of the communication terminal 20 is transmitted at a transmission predetermined time obtained by adding the communication disabled time of the communication terminal to the transmission time of the first file. Accordingly, even if a state where sufficient communication performance is not available on the side of the communication terminal 20 so that the next file is not receivable continues, the interruption of content reproduction can be prevented because files accumulated in the buffer memory will not be used up. Moreover, the server 10 can be prevented from being disabled to transmit to the communication terminal 20 due to excessive access to the server because the server 10 sets the transmission time after referring to the transmission amount to be transmitted to a plurality of the communication terminals 20.

It should be understood by those skilled in the art that various modifications, combinations, sub-combinations and alterations may occur depending on design requirements and other factors insofar as they are within the scope of the appended claims or the equivalents thereof.

For example, each step in processing of the server 10 and the communication terminal 20 herein are not necessarily processed chronologically in the order described as a flow chart. That is, each step in processing of the server 10 may be executed in parallel with even different processing.

Moreover, a computer program to cause hardware such as a CPU, ROM, and RAM contained in the server 10, the communication terminal 20 and the like to function equivalently to each component of the server 10 and communication terminal 20 described above can also be created. A storage medium in which the computer program is stored is also provided.

The present application contains subject matter related to that disclosed in Japanese Priority Patent Application JP 2009-186790 filed in the Japan Patent Office on Aug. 11, 2009, the entire content of which is hereby incorporated by reference.

What is claimed is:

1. An information processing apparatus comprising:
   a communication unit to transmit content to a communication device via a network; and
   a control unit to control transmission of the content by the communication unit,
   wherein:
      the control unit, in response to the communication unit receiving a transmission request from the communication device requesting transmission of the content and identifying a length of time of a communication disabled time detected by the communication device, calculates a first amount of content to be transmitted in two or more transmissions of content, the first amount of content being calculated based at least in part on the length of time of the communication disabled time to be an amount of content greater than or equal to an amount of content that can be reproduced by the communication device in a length of time corresponding to the length of time of the communication disabled time,
      the control unit causes the communication unit to transmit a first portion of the content, the first portion of the content comprising the first amount of the content, in response to the communication unit receiving the transmission request from the communication device, and
      the control unit sets a transmission predetermined time at which the communication unit is to transmit a second portion of the content subsequent to transmission of the first portion of the content, the second portion of the content comprising the first amount of the content and the second portion being a different portion of the content than the first portion, the control unit setting the transmission predetermined time to a time determined at least in part by adding a time for transmission of the first portion of the content to a time at which transmission of the first portion of the content begins.

2. The information processing apparatus according to claim 1, wherein, when communication between the information processing apparatus and the communication device is disabled multiple times within a predetermined time, the transmission request from the communication device identifying the length of time of the communication disabled time of the communication device is a maximum length of time of the lengths of time in which communication was disabled during the predetermined time.

3. The information processing apparatus according to claim 1, wherein the control unit calculates the first amount of the content to be the larger of a predetermined amount of content and the amount of the content that can be reproduced by the communication device in the length of time corresponding to the length of time of the communication disabled time.

4. The information processing apparatus according to claim 1, wherein the control unit includes a decision unit to determine the transmission predetermined time of the second portion of the content by adding a time for transmission of the first amount of the content included in the first portion, as calculated by the control unit, to the time at which transmission of the first portion begins.

5. The information processing apparatus according to claim 4, wherein the control unit includes:
   a detection unit to detect a number of transmissions to be transmitted by the communication unit at predetermined intervals; and
   a determination unit to determine whether a number of transmissions to be transmitted at the transmission predetermined time at which the second portion of the content is to be transmitted exceeds a predetermined threshold,
   wherein when the determination unit determines that the number of transmissions to be transmitted by the communication unit at the transmission predetermined time at which the second portion is to be transmitted exceeds the predetermined threshold, the decision unit changes the transmission predetermined time at which the second portion is to be transmitted to a time at which the number of transmissions to be transmitted by the communication unit is less than or equal to the predetermined threshold.

6. The information processing apparatus according to claim 5, wherein when the determination unit determines that the number of transmissions to be transmitted by the communication unit at the transmission predetermined time at which the second portion of the content is to be transmitted exceeds the predetermined threshold, the decision unit changes the transmission predetermined time at which the second portion is to be transmitted to a time at which the number of transmissions to be transmitted by the communication unit is less than or equal to the predetermined threshold and that is within a predetermined time range prior to or subsequent to the previously-set transmission predetermined time.

7. The information processing apparatus according to claim 6, wherein:
   when the decision unit changes the transmission predetermined time at which the second portion is to be transmitted to a time subsequent to the previously-set transmission predetermined time, the control unit changes an amount of the content to include in the first portion of the content from the first amount of the content to a second amount of the content.

8. The method of claim 6, wherein when the decision unit changes the transmission predetermined time at which the second portion is to be transmitted to a time subsequent to the previously-set transmission predetermined time, the control unit:
   determines whether the decision unit has changed the transmission predetermined time to an earlier time or a later time;
   when it is determined that the decision unit has changed the transmission predetermined time to a later time, increases an amount of the content to include in the first portion of the content from the first amount of the content to a second amount of the content.

9. The method of claim 8, wherein the control unit, when it is determined that the decision unit has changed the transmission predetermined time to an earlier time, refrains from changing an amount of the content to include in the first portion of the content.

10. An information processing method comprising the steps of:
   at a first device, setting a first amount of a content based at least in part on a length of time of a communication disabled time identified in a transmission request from a second device, the transmission request from the second device requesting transmission of the content, the first amount being an amount of a content to be included in each portion of a plurality of portions of the content, each portion of the plurality of portions to be included in a transmission from the first device, the communication disabled time corresponding to a time detected by the second device during which communication between the first device and the second device was disabled, wherein setting the first amount of content comprises setting the first amount to be an amount of content greater than or equal to an amount of content that can be reproduced by the second device in a length of time corresponding to the length of time of the communication disabled time;
   transmitting, from the first device to the second device connected to the first device via a network, a first portion of the content, the first portion of the content comprising the first amount of the content, wherein the transmitting of the first portion is performed in response to receiving at the first device the transmission request from the second device requesting transmission of the content; and
   transmitting, from the first device to the second device, a second portion of the content subsequent to transmission of the first portion at a transmission predetermined time, the second portion of the content being a different portion of the content than the first portion of the content, the second portion of the content comprising the first amount of the content, the transmission predetermined time being a time determined at least in part by adding a time for transmission of the first portion of the content to a time at which the transmitting of the first portion of the content begins.

11. At least one computer-readable storage device having encoded thereon computer-executable instructions that, when executed by at least one computer, cause the at least one computer to carry out a method comprising:
   transmitting content to a communication device via a network, wherein the transmitting comprises, in response to receiving a transmission request from the communication device requesting transmission of the content and identifying a length of time of a communication disabled time detected by the communication device,
   calculating a first amount of content to be transmitted in two or more transmissions of content, wherein the first amount of content is an amount of content greater than or equal to an amount of content that can be reproduced by the communication device in a length of time corresponding to the length of time of the communication disabled time, and transmitting a first portion of the content to the communication device, the first portion of the content comprising the first amount of the content, and transmitting a second portion of the content subsequent to transmission of the first portion at a transmission predetermined time, the second portion of the content comprising the first amount of the content and being a different portion of the content than the first portion of the content, the transmission predetermined time being a time determined at least in part by adding a time for transmission of the first portion of the content to a time at which the transmitting of the first portion of the content begins.

* * * * *